United States Patent
Hu et al.

(10) Patent No.: US 7,385,789 B2
(45) Date of Patent: Jun. 10, 2008

(54) MAGNETOSTRICTIVE ACTUATOR IN A MAGNETIC HEAD

(75) Inventors: David Hu, Los Altos, CA (US); Moris Dovek, San Jose, CA (US); Kowang Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 431 days.

(21) Appl. No.: 10/835,787

(22) Filed: Apr. 30, 2004

(65) Prior Publication Data

US 2005/0243473 A1 Nov. 3, 2005

(51) Int. Cl.
*G11B 21/21* (2006.01)
*G11B 5/56* (2006.01)
*G11B 5/58* (2006.01)

(52) U.S. Cl. .................................. 360/294.7
(58) Field of Classification Search ................ 360/317, 360/126, 128, 290, 294, 294.7
See application file for complete search history.

(56) References Cited

U.S. PATENT DOCUMENTS

| | | | | |
|---|---|---|---|---|
| 5,031,055 A | * | 7/1991 | Yanagisawa | ............. 360/294.7 |
| 6,249,064 B1 | * | 6/2001 | Bradbury | ..................... 310/22 |
| 6,587,314 B1 | | 7/2003 | Lille | ........................... 360/313 |
| 6,934,113 B1 | * | 8/2005 | Chen | ............................ 360/75 |
| 6,992,865 B2 | * | 1/2006 | Thurn et al. | ............. 360/294.7 |
| 7,064,933 B2 | * | 6/2006 | Macken et al. | .......... 360/294.7 |
| 7,154,696 B2 | * | 12/2006 | Nikitin et al. | ................ 360/75 |
| 2003/0174430 A1 | | 9/2003 | Takahashi et al. | ............ 360/75 |
| 2005/0264912 A1 | * | 12/2005 | Nikitin et al. | ................ 360/75 |
| 2006/0061910 A1 | * | 3/2006 | Thurn et al. | ............. 360/234.7 |

FOREIGN PATENT DOCUMENTS

| | | | | |
|---|---|---|---|---|
| JP | 05151734 | A | * | 6/1993 |
| JP | 09180382 | A | * | 7/1997 |
| JP | 11126449 | A | * | 5/1999 |
| JP | 2000149223 | A | * | 5/2000 |

* cited by examiner

*Primary Examiner*—William J Klimowicz
(74) *Attorney, Agent, or Firm*—Saile Ackerman LLC; Stephen B. Ackerman

(57) ABSTRACT

In order to obtain improved magnetic track density, it is desirable to bring the read and write elements as close to the recording surface as possible, short of actually touching it. This has been achieved by utilizing a magnetostrictive actuator, comprising single or multiple pairs of magnetostrictive elements and their associated conductor coils. A magnetic field is generated by passing electrical current through the conductor coils. This field will saturate the actuator and cause the magnetostrictive elements to contract or expand, thus moving the read/write element whenever so desired.

24 Claims, 2 Drawing Sheets

MAGNETOSTRICTIVE ACTUATOR IN A MAGNETIC HEAD

FIELD OF THE INVENTION

The invention relates to the general field of magnetic disk storage systems with particular reference to dynamically adjusting a part of the ABS (air bearing surface) in order to vary the distance between the read and/or write elements and the recording media.

BACKGROUND OF THE INVENTION

It is well known that increasing areal density in magnetic recording requires a corresponding reduction in the magnetic spacing between the write/read elements and the recording media. Previous inventions in this field have employed piezoelectric elements, thermal heating coils, and electrostatic attraction to reduce magnetic spacing. For example, a piezoelectric transducer (PZT) was applied to the suspension so as to reduce the flying height at the head region. Reducing the flying height is, however, undesirable because of the increased likelihood of head disk interference or even a head crash.

Thermal protrusion does not reduce the slider flying height, but it increases the sensor temperature and thus reduces reliability of the sensor. In addition, thermal expansion is relatively slow in response time. Electrostatic attractive force generation between head and media through a voltage application at the slider body has deficiency in potential "pull-in" crash due to the non-linearity in actuation outside the narrow nominal range. Also, the electrical charge could discharge to result in pin hole formation at the surface of the recording disk, creating a potential reliability problem of corrosion. There is a need for performance and reliability improvement on the methodology to achieve magnetic spacing adjustment.

A routine search of the prior art was performed with the following references of interest being found:

In U.S. Pat. No. 6,587,314, Lille discloses a deformable layer to temporarily reduce magnetic spacing between the head and the disk while in US Application Publication 2003/0174430, Takahashi et al show use of thermal expansion to adjust magnetic spacing.

SUMMARY OF THE INVENTION

It has been an object of at least one embodiment of the present invention to dynamically vary the separation between the write gap in a write head and the recording medium surface.

Another object of at least one embodiment of the present invention has been to dynamically vary the separation between the sensor part of a read head and the recording medium surface.

Still another object of at least one embodiment of the present invention has been to provide a strain/stress sensor for use in conjunction with a read-write head.

A further object of at least one embodiment of the present invention has been to provide a means to detect contact between a read-write head and a recording medium surface.

These objects have been achieved by utilizing a magnetostrictive actuator, comprising single or multiple pairs of magnetostrictive elements and their associated conductor coils. A magnetic field is generated by passing electrical current through the conductor coils. This field will saturate the actuator and cause the magnetostrictive elements to contract or expand, thus moving the read/write element in the slider along the desired direction. The read element and the write element may be independently controlled or they may be caused to move together. By observing changes in the power used to energize the actuator coils, the device may also be used as a strain/stress sensor or as a contact detector (between either element and the recording medium surface).

DESCRIPTION OF THE PREFERRED EMBODIMENTS

The present invention discloses a new method of controlling magnetic spacing. It utilizes a magnetostrictive actuator, comprising single or multiple pairs of magnetostrictive elements and their associated conductor coils. A magnetic field is generated by passing electrical current through the conductor coils. The field in turn will saturate the actuator and cause the magnetostrictive elements to contract or expand, thus moving the read/write element in the slider along the desired direction.

Figure 1:
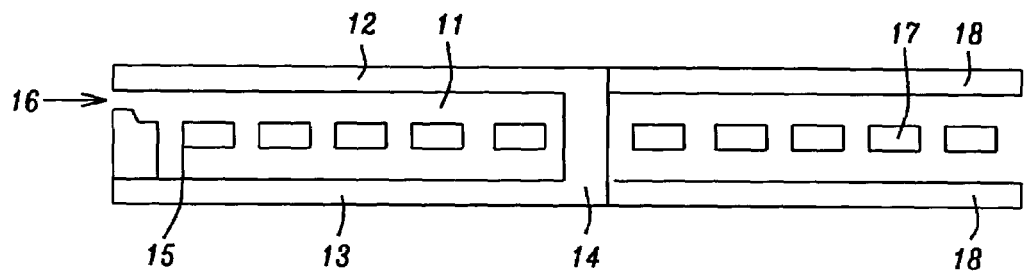
FIG. 1 shows a first embodiment of the invention, employing a single actuator coil used in conjunction with a pair of magnetostrictive rods.

A preferred embodiment of this invention is to embed the actuator into a slider element during wafer fabrication. The actuator position can be determined by considering the desired read/write element actuation and the complexity of wafer process integration. Another embodiment of the invention requires individual conductor coils for write field generation and for saturation of the actuator. A schematic diagram of this design is shown in FIG. 1. Multiple magnetostrictive actuators can be embedded in the slider to achieve a particular actuation profile at the read/write element either individually (i.e. one actuator for reader and the other for writer) or collectively through superposition effects.

Figure 2:
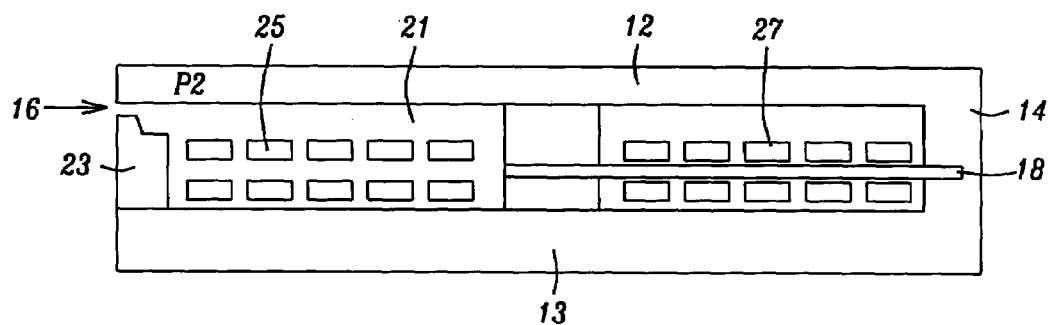
FIG. 2 shows a second embodiment of the invention, employing a two layer actuator coil used in conjunction with a single magnetostrictive rod.

Another embodiment of the invention utilizes the magnetic field generated by the existing write coils for easy wafer process integration. A schematic example of this configuration, with the placement of the actuator between the two-layer "return" write coils, is shown in FIG. 2. In this design, the actuation mode can be accomplished with opposite current flows at the top and bottom coils, so that no magnetic flux is produced at the ABS due to cancellation. When the current direction is the same in both coils, the writer activates for writing at the disk and the actuator is de-activated with canceled magnetic field.

For the actuator rod, materials having a high magnetostriction constant (k), such as Terfenol (an alloy with Iron, Terbium and Dysprosium) are to be preferred. Other possible magnetostrictive materials that could be used in place of Terfenol include TbZn, TbDyZn, $Fe_3O_4$, $TbFe_2$, $DyFe_2$, and $SmFe_2$. The choice of material for the coil is less restricted—it can be any good electrical conductor, such as copper. The coil can be used to conduct current for the generation of a magnetic field for actuation, or it can be used to sense mechanical stress and produce an electrical signal. Therefore, the actuator can simultaneously be used to sense head-disk interference.

The biasing requirement of this actuator is similar to an MR head where an adjustable constant current is forced thru the coil for actuation, and a low noise differential preamp can be used for sensing the voltage on the coil from a signal generated by head disk contact. A constant voltage bias can also be used together with sensing current changes in the coil from a signal generated by head-disk contact.

More specifically, we refer once again to FIG. 1 where slider element 11 is seen to also be a self-contained write head that includes top and bottom magnetic poles 12 and 13 respectively, separated at one end by write gap 16 and magnetically connected at the other end by yoke 14.

Write coil 15 lies inside slider element 11 while a second, actuator, coil (17) lies in line with, and wholly outside of, slider element 11. Attached to yoke 14 are rods 18 of magnetostrictive material, one above and one below said coil 17.

Thus, when coil 17 is energized, rods 18 expand, because of their magnetostrictive characteristics, and cause slider element 11 to move in a direction normal to the ABS.

Referring next to FIG. 2, in this embodiment both slider and actuator elements are housed within the write head. As before, top and bottom magnetic poles, 12 and 13 respectively are separated at one end by write gap 16 and magnetically connected through yoke 14 at the other end.

Two layer write coil 25 lies inside slider element 21 which also includes vertical magnetic member 23 that serves to provide magnetic continuity between the top and bottom magnetic poles, including write gap 16. Rod of magnetostrictive material 18 is attached to the rear wall of slider 21, extending away therefrom so as to lie between upper and lower actuator coils 27 so that when the latter are energized, rod 18 pushes on slider element 21 and causes it to move in a direction normal to the ABS.

Figure 3:
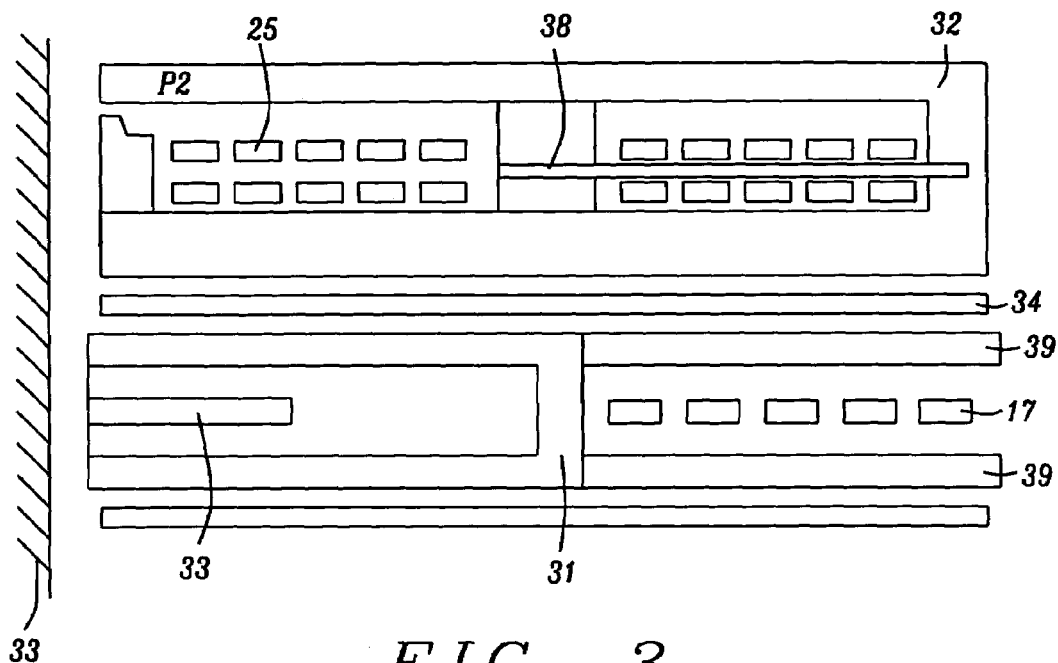
FIG. 3 illustrates a read-write head containing read and write heads, both of which are moveable relative to the ABS.

FIG. 3 illustrates a read-write head in which both heads may be moved in a direction normal to the ABS. Seen there are actuator rods 38 and 39. Rod 38 is part of moveable write head 32, which is the same as the device shown in FIG. 2. It could however, as a matter of design choice, have been the design that is shown in FIG. 1.

Immediately below device 32 (and separated therefrom by magnetic shield layer 34) is moveable read head 31 which is caused to move by the action of rods 39. It is apparent that the moveable read head (shown in its extended position of closest approach to the surface of recording medium layer 33, which reduces its normal distance therefrom by between about 3 and 4 nm) is similar in most respects to the writer device seen in FIG. 1 except that, in place of a write coil and a write gap, it contains magnetic field sensor 33 which could be, for example, a GMR (Giant Magneto-Resistance) device or a MTJ (Magnetic Tunnel Junction device).

It is important to note that, although FIG. 3 shows the read and write heads under the control of independently operated actuators, it would be a straightforward matter of design choice to provide only a single actuator for the read-write unit as a whole so that both read and write heads always move together.

In general, magnetostrictive rod 38 would be between about 100 and 125 microns long and magnetostrictive rods 39 would also be between about 100 and 125 microns long. Additionally, while element 32 is writing data, the actuator that is connected to element 31 may be used as a strain/stress sensor and/or as a detector of any contact between the read-write head and the recording medium surface. Similarly, when element 33 is reading data, the actuator that is connected to element 31 may be used as a strain/stress sensor and/or as a detector of any contact between the read-write head and the recording medium surface.

CONFIRMATION OF THE EFFECTIVENESS OF THE INVENTION

To verify the effectiveness of the magnetostrictive actuator in reducing magnetic spacing, a finite element model (FEM) was created for simulation of the steady-state condition. Planar writer structures for each of the two embodiments discussed above were investigated. In the first example there are two actuator rods at the same levels, and same thicknesses, as the top layer write coil and the bottom layer write coil (see FIG. 1). The layout of each actuator in the simulation was 100 µm by 100 µm. The distance from the front edge of the actuators to the ABS was 37 µm. In the second example, the magnetostrictive actuator was embedded between the top/bottom write return coils (FIG. 2). The thickness was 2 µm and the layout was 100 µm by 100 µm. The distance from the front edge of the actuator to the ABS was 12 µm. The material for the actuator in the simulation was Terfenol (with magnetostriction $\lambda$ at 0.2%. The actuators were assumed to be fully saturated by the magnetic field for maximum magneto-mechanical effect.

Figure 4:
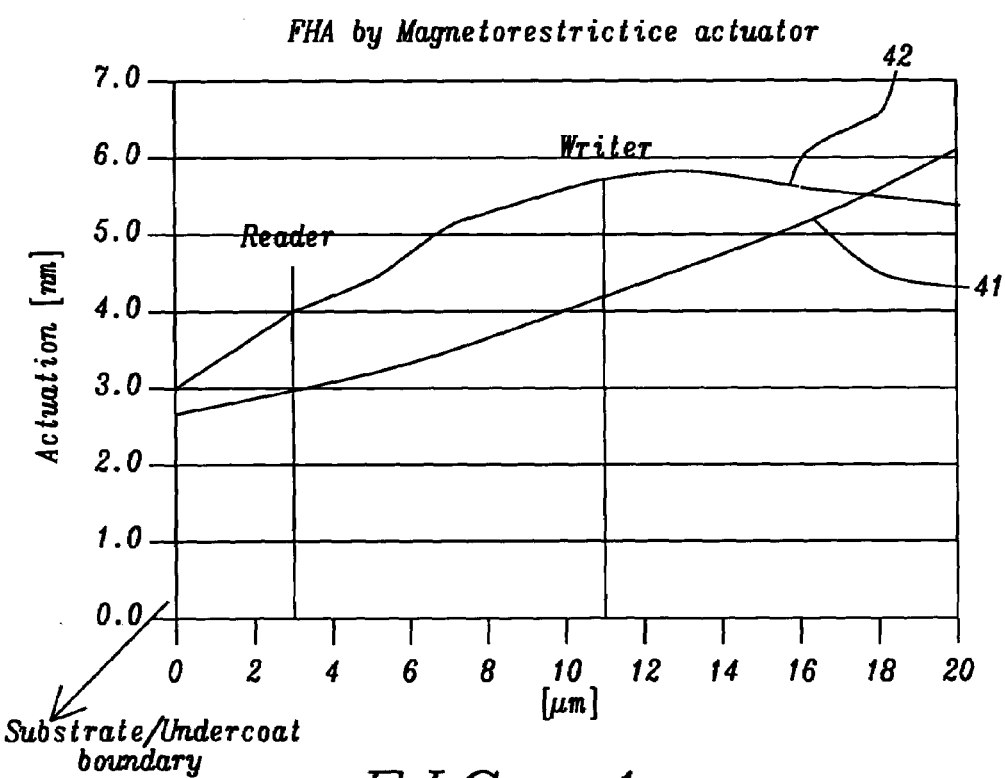
FIG. 4 displays actuation profiles for FHA (flying height adjustment) obtained through simulation for both reader and write heads.

The actuation profiles from the FEM computation for both examples are shown in FIG. 4. For the first example (curve 41), the write gap actuation was 4.1 nm and the read gap actuation was 2.8 nm. In the second example (curve 42), the reader actuation was 4 nm and 5.7 nm for the writer. The profile computed for the second example is more desirable since the actuation at the overcoat region is attenuated, unlike in the first example. Higher actuation efficiency can be achieved through further optimization of actuator layout (e.g. aspect ratio), thickness, embedded position in the slider, material selection, etc.

Note that a magnetostrictive actuator is significantly more efficient for power dissipation, and significantly faster in response time, when compared to thermal heating methods. Since it utilizes controllable localized protrusion to reduce the magnetic spacing, it can maintain a safe flying height margin thereby maintaining the reliability of the head disk interface.

Note, too, that since the actual amount of expansion of the actuator rods is very small, the length and elasticity of the leads that connect the device to the outside world is more than sufficient to accommodate the associated stress (about 8 mPa for gold leads at least 100 microns long).

What is claimed is:

1. A write head, that is dynamically moveable normal to its ABS, comprising:

a slider element formed from top and bottom magnetic poles, separated at a first end by a write gap and magnetically connected at an opposing second end by a yoke;

a first coil inside said slider element;

outside said slider element and coplanar with said first coil, a second coil extending away from said yoke;

attached to said yoke, rods of magnetostrictive material disposed above and below said second coil; and whereby, when said second coil is energized, said rods cause said slider element to move in a direction normal to the ABS.

2. The write head described in claim 1 wherein said magnetostrictive material is selected from the group consisting of FeTbDy, TbZn, TbDyZn, $Fe_3O_4$, $TbFe_2$, $DyFe_2$, and $SmFe_2$.

3. The write head described in claim 1 wherein said rods of magnetostrictive material are between about 100 and 125 microns long.

4. The write head described in claim 1 wherein said second coil may be provided with a bias current during normal operation of the write head whereby said rod of magnetostrictive material may be made to expand or contract, as needed.

5. The write head described in claim 1 wherein said coils are copper.

6. The write head described in claim 1 wherein, at its full extension, said write element has its distance from a recording medium surface reduced by between about 3 and 4 nm.

7. The write head described in claim 1 wherein a maximum current of between about 30 and 50 mA is used to energize said second coil.

8. The write head described in claim 1 wherein said slider element may also be used as a strain/stress sensor.

9. The write head described in claim 1 wherein said slider element may also be used to detect contact between said write head and a recording medium surface.

10. A read head, that is dynamically moveable normal to its ABS, comprising:

a slider element having front and rear surfaces;

within said slider element a magnetic field detector disposed so that its sensor surface is part of said slider front surface;

outside said slider element, an actuator coil extending away from said slider rear surface;

attached to said slider rear surface, rods of magnetostrictive material disposed above and below said actuator coil; and whereby, when said actuator coil is energized, said rods cause said slider element to move in a direction normal to the ABS.

11. The read head described in claim 10 wherein said magnetic field detector is a GMR device.

12. The read head described in claim 10 wherein said magnetic field detector is a MTJ device.

13. The read head described in claim 10 wherein said magnetostrictive material is selected from the group consisting of FeTbDy, TbZn, TbDyZn, $Fe_3O_4$, $TbFe_2$, $DyFe_2$, and $SmFe_2$.

14. The read head described in claim 10 wherein said rods of magnetostrictive material are between about 100 and 125 microns long.

15. The read head described in claim 10 wherein said actuator coil is provided with a bias current during normal operation of the read head whereby said rods of magnetostrictive material are made to expand or contract, as needed.

16. The read head described in claim 10 wherein, at its full extension, said slider element has its distance from a recording medium surface reduced by between about 3 and 4 nm.

17. The read head described in claim 10 wherein a maximum current of between about 30 and 50 mA is used to energize said actuator coil.

18. The read head described in claim 10 wherein said slider element is also used as a strain/stress sensor.

19. The read head described in claim 10 wherein said slider element is also used to detect contact between said read head and a recording medium surface.

20. A read-write head, dynamically moveable normal to its ABS, comprising:

a first slider element, comprising a write coil, a write gap, and a rear wall, located between a first actuator coil and the ABS;

a first rod of magnetostrictive material, connected to said first slider element rear wall and disposed to be magnetizable by said first actuator coil;

a second slider element, having front and rear surfaces and located between a second actuator coil and the ABS, containing a magnetic field detector disposed so that its sensor surface is part of said second slider element front surface; and a second rod of magnetostrictive material, connected to said second slider element rear surface and disposed to be magnetizable by an actuator.

21. The read-write head described in claim 20 wherein each of said slider elements is connected to a different actuator through a different magnetostrictive rod whereby, when a given actuator coil is energized, only the slider element to which it is connected is caused to move in a direction normal to the ABS.

22. The read-write head described in claim 21 wherein said rods of magnetostrictive material are between about 100 and 125 microns long.

23. The read-write head described in claim 20 wherein, while said first slider element is writing data an actuator connected to said second slider element is used as a strain/stress sensor and as contact detector between said read-write head and a recording medium surface.

24. The read-write head described in claim 20 wherein, while said second slider element is reading data an actuator connected to said first slider element is used as a strain/stress sensor and as contact detector between said read-write head and a recording medium surface.

* * * * *